United States Patent
Garrison et al.

(10) Patent No.: US 8,333,138 B2
(45) Date of Patent: Dec. 18, 2012

(54) COMPOSITE REINFORCED MISSILE RAIL

(75) Inventors: Robert A. Garrison, New Palestine, IN (US); Robert A. Bailey, Avon, IN (US)

(73) Assignee: Raytheon Company, Waltham, MA (US)

(*) Notice: Subject to any disclaimer, the term of this patent is extended or adjusted under 35 U.S.C. 154(b) by 310 days.

(21) Appl. No.: 12/556,705

(22) Filed: Sep. 10, 2009

(65) Prior Publication Data

US 2012/0060674 A1 Mar. 15, 2012

Related U.S. Application Data

(60) Provisional application No. 61/096,673, filed on Sep. 12, 2008.

(51) Int. Cl.
*F41F 7/00* (2006.01)
*B05D 7/22* (2006.01)

(52) U.S. Cl. ........................ 89/1.819; 427/181

(58) Field of Classification Search ................ 89/1.816, 89/1.817, 1.818, 1.819; 72/261, 253.1, 274; 427/181
See application file for complete search history.

(56) References Cited

U.S. PATENT DOCUMENTS

| | | | |
|---|---|---|---|
| 2,795,962 A * | 5/1957 | Granfelt | 220/507 |
| 3,972,529 A * | 8/1976 | McNeil | 473/320 |
| 4,358,983 A | 11/1982 | Fallon et al. | |
| 4,660,456 A | 4/1987 | Griffin et al. | |
| 4,911,059 A * | 3/1990 | Brueckner | 89/1.819 |
| 4,926,740 A * | 5/1990 | Griffin et al. | 89/1.819 |
| 5,497,691 A * | 3/1996 | Graham | 89/1.819 |
| 5,746,387 A * | 5/1998 | Pretto et al. | 242/571.2 |
| 5,970,842 A * | 10/1999 | Knapp et al. | 89/1.54 |
| 6,505,454 B2 * | 1/2003 | Dingler | 52/842 |
| 6,838,162 B1 | 1/2005 | Gruber et al. | |
| 2006/0070340 A1 * | 4/2006 | Fanucci et al. | 52/729.1 |

FOREIGN PATENT DOCUMENTS

| | | | |
|---|---|---|---|
| GB | 1 232 055 | * | 5/1971 |
| GB | 2 188 713 A | | 10/1987 |
| WO | WO 03/033348 A2 | | 4/2003 |

OTHER PUBLICATIONS

PCT, Notification of Transmittal of the International Search Report and the Written Opinion of the International Searching Authority, or the Declaration, International Application No. PCT/US2009/056606, 13 pages, Dec. 2, 2009.

* cited by examiner

*Primary Examiner* — Bret Hayes
(74) *Attorney, Agent, or Firm* — Renner, Otto, Boisselle & Sklar, LLP

(57) ABSTRACT

According to one embodiment, an apparatus comprises a frame portion made of metal and having a substantially elongated shape. The frame portion comprises one or more cavities situated in a longitudinal direction, and a composite material is disposed within the cavities to structurally reinforce the frame portion. The frame portion includes one or more missile guides situated in the longitudinal direction and configured to slidingly engage a weapon.

13 Claims, 3 Drawing Sheets

COMPOSITE REINFORCED MISSILE RAIL

RELATED APPLICATIONS

This application claims priority to U.S. Provisional Patent Application Ser. No. 61/096,673 entitled "COMPOSITE REINFORCED MISSILE RAIL," which was filed on Sep. 12, 2008.

TECHNICAL FIELD

This invention relates generally to the field of military armament and more specifically to a composite reinforced missile rail.

BACKGROUND

Military aircraft use various types of weapons, such as missiles, to disable known threats during combat. The weapons may be configured underneath the fuselage or wings of the aircraft and may be released at a precise moment to strike an intended target. Missile launchers may be used to couple the weapons to the aircraft and release the weapons. Known metal missile launchers may commonly experience fatigue problems.

SUMMARY OF THE DISCLOSURE

According to one embodiment, an apparatus comprises a frame portion made of metal and having a substantially elongated shape. The frame portion comprises one or more cavities situated in a longitudinal direction, and a composite material is disposed within the cavities to structurally reinforce the frame portion. The frame portion includes one or more missile guides situated in the longitudinal direction and configured to slidingly engage a weapon.

Some embodiments of the disclosure may provide one or more technical advantages. As an example, the missile rail may incorporate a composite material. The composite material may improve strength-to-weight ratio and/or physical stress and fatigue characteristics over other known missile rail designs. As another example, the composite material may possess physical properties suitable to dissipate kinetic energy and improve dampening of vibration through the rail.

Some embodiments may benefit from some, none, or all of these advantages. Other technical advantages may be readily ascertained by one of ordinary skill in the art.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1-4 of the drawings, like numerals being used for like and corresponding parts of the various drawings.

Aircraft deploying certain types of weapons, such as missiles, are typically configured with rails to guide a released missile along a flight path for a short distance. These rails are generally formed of a relatively strong, rigid material to securely maintain the missile in proper alignment. Known implementations of missile rails are typically formed of solid metal, such as aluminum, to handle the stress generated by the aircraft. The relatively high levels of stress generated by modern military aircraft, however, may weaken missile rails made of solid metal. Additionally, metal materials may fail to adequately dampen vibrations caused by modern military aircraft. Exposure to vibrations may cause the missile rails to weaken over time. Embodiments of the present disclosure may address these and other problems.

Figure 1:
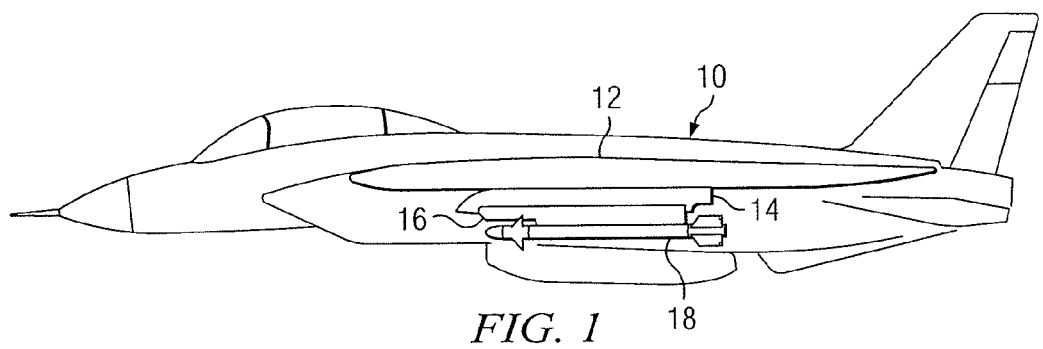
FIG. 1 illustrates an example of an aircraft configured with a composite reinforced missile rail.

FIG. 1 illustrates an example of an aircraft 10 configured with a composite reinforced missile rail. In some embodiments, the aircraft 10 may possess certain high performance characteristics suitable for military operation, which may increase the stress levels incident on the aircraft 10 during flight. For example, modern military aircraft may turn at speeds that cause over 10 Gs of force to be applied to various aircraft components, such as a missile system coupled under a wing 12 or a fuselage of the aircraft 10.

In some embodiments, the missile system may comprise a pylon 14, a composite reinforced missile rail 16, which may be part of a missile launcher, and a missile 18. The missile launcher may be configured to release the missile 18 at a precise moment to strike an intended target. The missile launcher may hold the missile 18 in place prior to release, and may guide the missile 18 along the flight path for a short distance after release. Accordingly, the missile launcher may be designed to handle not only its own weight, but also the weight of the attached missile 18. In some embodiments, the missile launcher may comprise a composite material to reinforce the structure and decrease failures related to stress and fatigue.

Figure 2:
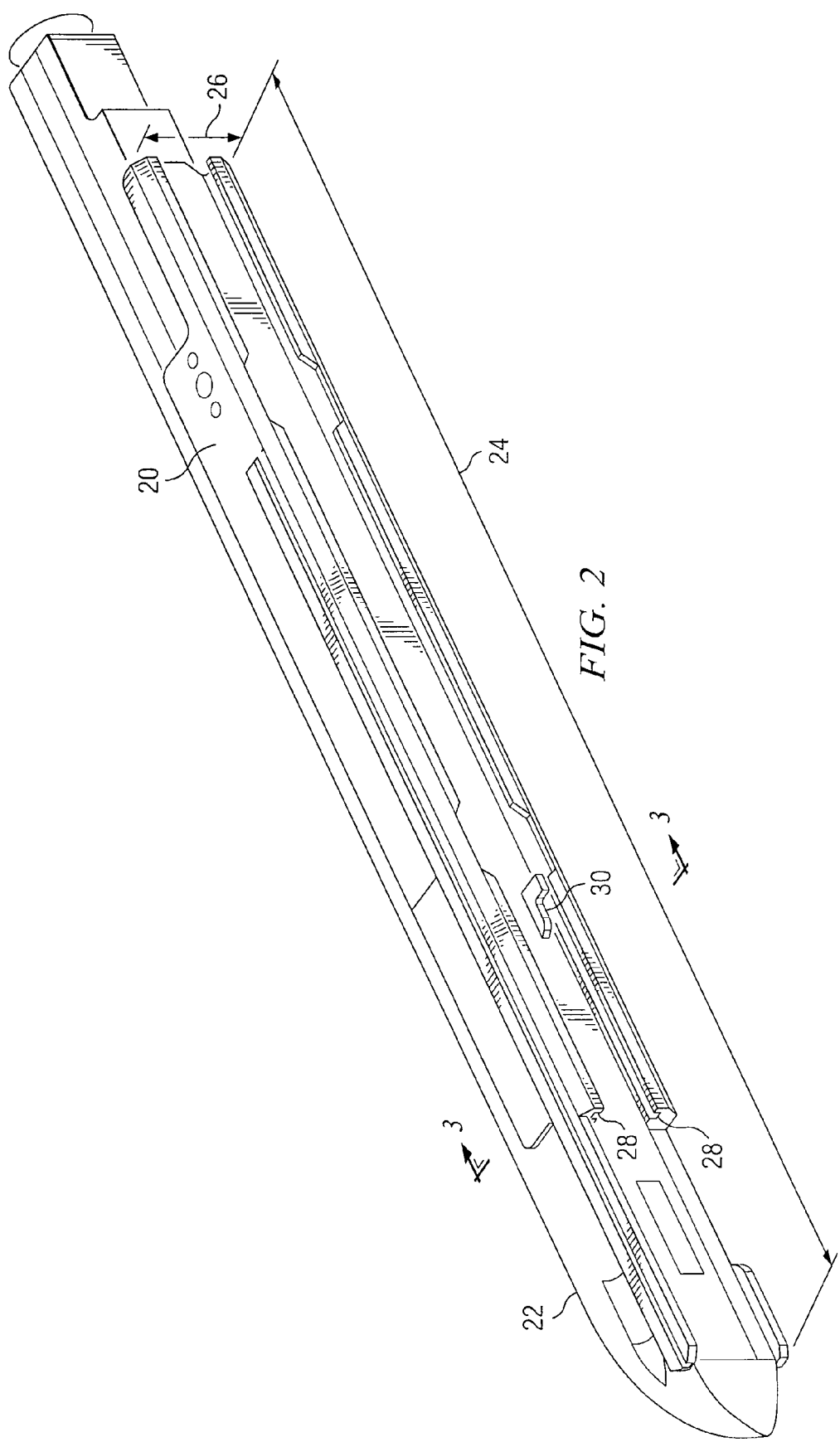
FIG. 2 illustrates a perspective view of a composite reinforced missile rail.

FIG. 2 illustrates a perspective view of the composite reinforced missile rail 16. In some embodiments, the missile rail 16 may comprise a frame portion 20 having a substantially elongated shape. For example, the frame portion may have a longitudinal direction 24 approximately 50 to 60 inches long and a width direction 26 approximately 3 to 5 inches wide, such as approximately 3½ inches.

The frame portion 20 may comprise one or more missile guides 28 situated in the longitudinal direction 24 and configured to slidingly engage a weapon, such as a missile. Individual missile guides 28 may traverse from one end to an opposite end of the missile rail 16 in the longitudinal direction, or may alternatively traverse a smaller sub-section of the longitudinal direction. The missile guides 28 may have a consistent shape along the longitudinal direction. In some embodiments, the missile may fit loosely within the guides 28 of the missile rail 16, and metal stubs, such as snubbers, may be used to hold the missile in place so that the missile does not bounce within the rails during flight. In some embodiments, a forward detent 30 may secure the missile in the missile rail 16 to prevent the missile from being released. When it is time to fire the missile, the forward detent 30 may be opened and the missile may be propelled from the missile rail.

The missile rail 16 may comprise a metal and a composite material to structurally reinforce the metal. Examples of the metal may include aluminum, titanium, steel, or an alloy of any of the preceding. In some embodiments, aluminum may be selected to provide a friction coefficient similar to known missile rails, which may be commonly formed of aluminum. The friction coefficient may describe the level of friction experienced as the missile slides off the rails, and substantially matching the friction coefficient of the frame portion 20 to that of known missile rails may alleviate certain design and test requirements.

In some embodiments the composite material may comprise a hardenable resin, such as epoxy, and a plurality of fibers suitable to reinforce the resin, such as graphite, fiberglass, or KEVLAR (para-aramid synthetic fibers). Suitable resins may be commercially available. The composite material may be disposed in regions of the missile rail 16 that typically experience a relatively high level of stress and/or fatigue. For example, portions of the missile rail 16 having sharp corners, such as corners defined by missile guides 28, may be reinforced with the composite material. The structurally reinforced guides 28 may be less prone to warp under stress than known missile guides, and may therefore reduce the likelihood of the missile becoming snagged or misdirected when released from the missile rail 16.

Figure 3:
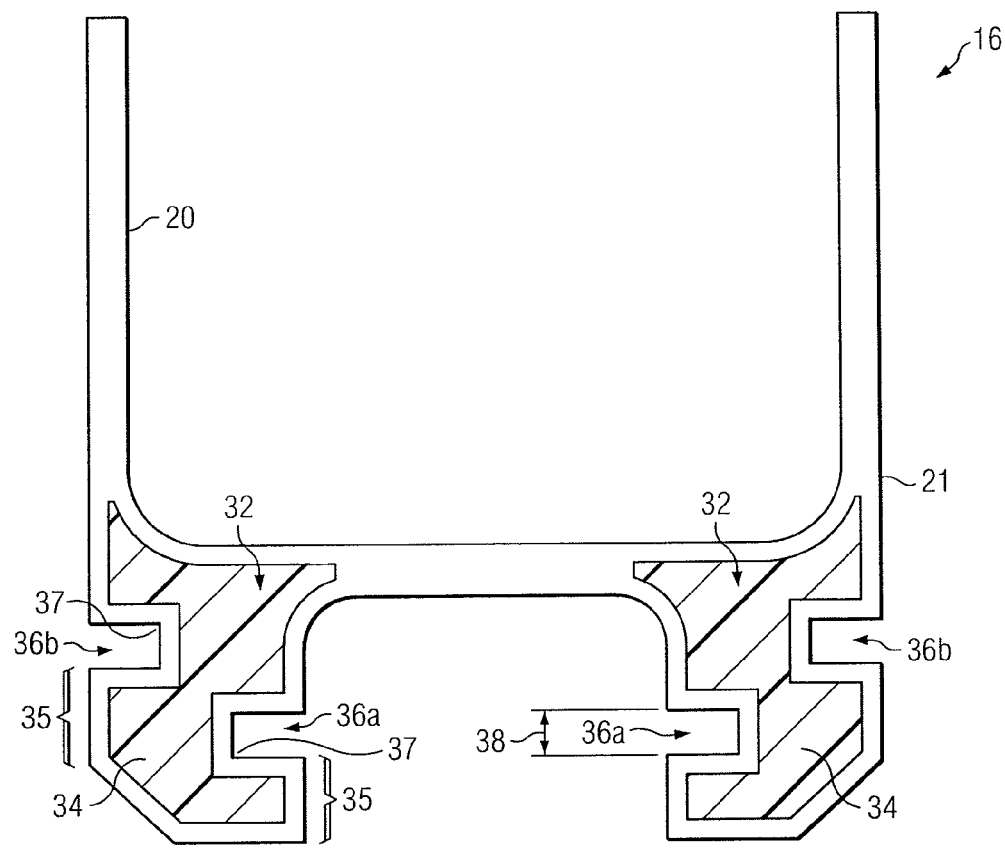
FIG. 3 illustrates an enlarged, cross-sectional view of one embodiment of a composite reinforced missile rail.

FIG. 3 illustrates an enlarged, cross-sectional view of an embodiment of a composite reinforced missile rail 16. In this particular embodiment, the missile rail 16 is a LAU-127 type missile rail. The missile rail 16 includes an elongated frame portion 20 which defines one or more cavities 32 filled with a composite material 34. The cavities 32 may be formed over any cross-sectional area of the frame portion 20, including those regions of the frame portion 20 that typically experience a relatively high level of stress and/or fatigue. For example, support projections 35 may support a substantial amount of a missile's weight and may therefore experience a relatively high level of stress and fatigue. As another example, the missile rail 16 may include one or more missile guides 36 defining guide corners 37 that may experience a relatively high level of stress and/or fatigue.

In some embodiments, the missile guides 36 may be configured for slidable engagement of a missile. The dimensions of the missile guides 36 may be selected to loosely hold a missile. For example, a height 38 of the missile guides 36 may be approximately 0.1 to 0.3 inches, such as 0.19 inches. In some embodiments, the missile rail 16 may be configured to hold more than one type of missile. As an example, missile guides 36a may be configured to hold a missile having a "T" shaped hanger and missile guides 36b may be configured to hold a missile having a "U" shaped hanger.

The missile rail 16 may be formed using any suitable method. In one embodiment, the frame portion 20 is shaped using an extrusion process. The extrusion process may press metal, such as aluminum, through an extrusion mold such that the cavities 32 are formed during the extrusion process. In other embodiments, the cavities 32 may be formed in the frame portion 20 using any suitable process, such as by drilling or reaming.

Composite material 34 may be disposed within each cavity 32 of the frame portion 20 using any suitable method. In some embodiments, the composite material 34 may be disposed within the cavity 32 using a pultrusion process. For example, a plurality of fibers having a length substantially equal to a length of the cavity 32 may be soaked in resin, and the fibers may be disposed in the cavity 32 by a pushing method, according to which the fibers are pushed into the cavity 32 and/or pulling method, according to which fibers are pulled into cavity 32. In some embodiments, the composite material 34 may be disposed within the cavity 32 using a stuffing process. For example, a plurality of chopped, resin-soaked fibers having a relatively short length, such as less than a few inches, may be stuffed in the cavity 32.

Upon proper placement of the composite material 34 within the cavity 32, the resin may be cured. For example, the resin may be exposed to heat and/or vacuum pressure. In some embodiments, the frame portion 20 of the missile rail 16 may comprise small vent holes situated along the longitudinal direction to aid in curing the resin. The approximate amount of time required to cure the resin may vary from a couple of hours to a few days, depending on the materials selected and the size and shape of the composite-filled cavity 32.

In some embodiments, the missile rail 16 may further comprise a protective layer 21 such as KEVLAR (para-aramid synthetic fibers), SPECTRA (polyethylene fibers), TWARON (para-aramid synthetic fibers), or fiberglass, disposed outwardly from the frame portion. The protective layer 21 may provide enhanced corrosion resistance and impact resistance.

Figure 4:
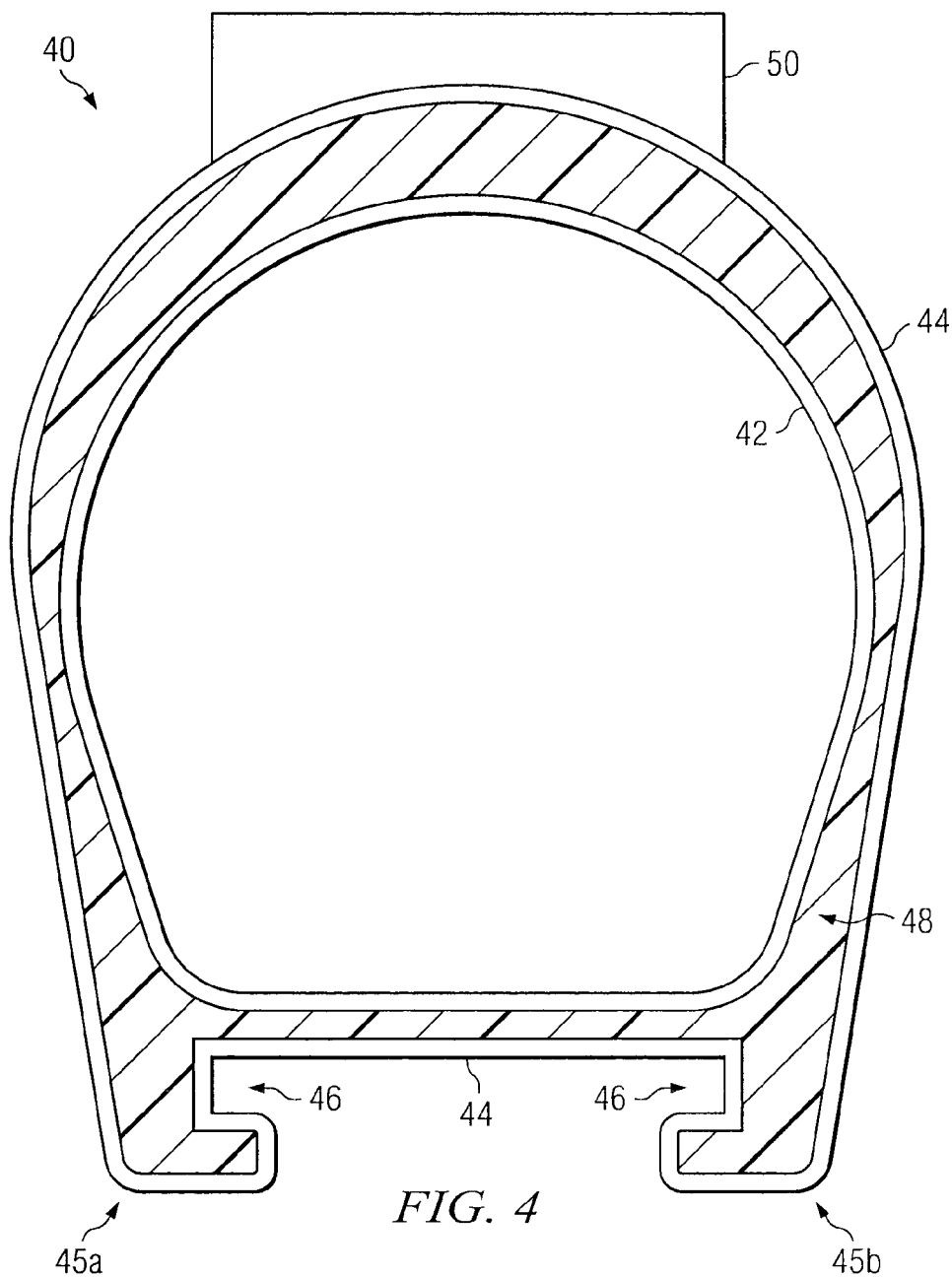
FIG. 4 illustrates an enlarged, cross-sectional view of another embodiment of a composite reinforced missile rail.

FIG. 4 illustrates an enlarged, cross-sectional view of another embodiment of a composite reinforced missile rail 40. In this particular embodiment, missile rail 40 is a LAU-7 type missile rail. In some embodiments, missile rail 40 comprises a frame portion 42, an outer layer 44, one or more missile guides 46, a composite material 48, and a mounting member 50. The frame portion 42 may comprise a metal, such as aluminum, and may define the structure of the missile rail 40. For example, the frame portion 42 may have a longitudinal direction and a substantially cylindrical shape configured to hold internal components of a missile launcher.

In some embodiments, the outer layer 44 may be a second frame portion and may comprise a metal, such as aluminum. Alternatively, in some embodiments, the outer layer 44 may comprise more than one section, and each section may be made of a different material. For example, a first section may comprise metal and may be located where the missile rail 40 is configured to engage a missile. In the example, the first section may include the "T" shaped region extending between outer corners 45a and 45b of the missile rail 16 and comprising the missile guides 46. A second section may comprise a protective layer, such as KEVLAR (para-aramid synthetic fibers), SPECTRA (polyethylene fibers), TWARON (para-aramid synthetic fibers), or fiberglass. In the example, the second section may include the outermost "U" shaped region of the missile rail 40.

In some embodiments, the missile guides 46 may be configured to slidingly engage a weapon. The missile guides 46 may have a height of approximately 0.1 to 0.3 inches, such as 0.19 inches, and may be configured to hold one or more types of missiles, such as missiles having "T" shaped hangers (shown) or "U" shaped hangers (not shown).

In some embodiments, the composite material 48 may comprise a fiber reinforced resin such as that described in FIG. 2. In some embodiments, the composite material 48 may comprise a pre-preg material. For example, the composite material may comprise sheets of fiber woven together and bonded using a resin.

The missile rail 40 may be formed using any suitable method. In some embodiments, the frame portion 42 may be formed using an extrusion process. The composite material may then be deposited outwardly from an outward surface of the frame portion 42 to provide structural reinforcement. For example, the frame portion 42 may be wrapped in individual sheets of composite material 48 until a predetermined thickness, such as 0.5 to 1.0 inches, is obtained. The resin may then be cured. In some embodiments, the curing process may be accelerated by applying heat and/or vacuum pressure.

In some embodiments, the frame portion 42 of the missile rail 40 may comprise small vent holes situated along the longitudinal direction to aid in curing the resin. In embodiments comprising a metal outer layer 44, the outer layer 44 may similarly be wrapped on a surface configured to face the frame portion 42, such as the surface comprising the concave portion of the U-shape. When sufficient thickness is achieved, the frame portion 42 and the outer layer 44 may be pressed together such that the overall profile of the missile rail 40 is essentially similar to that of known LAU-7 type missile rails.

In some embodiments, the missile rail 40 may further comprise a protective layer, such as KEVLAR (para-aramid synthetic fibers), SPECTRA (polyethylene fibers), TWARON (para-aramid synthetic fibers), or fiberglass, disposed outwardly from the frame portion. The protective layer may provide enhanced corrosion resistance and impact resistance.

In some embodiments, the missile rail 40 may be coupled to a missile launcher. The missile rail 40, together with the missile launcher, may be coupled to a vehicle, such as an aircraft, using the mounting member 50.

Modifications, additions, or omissions may be made to the methods described without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. An apparatus comprising:
   a frame portion:
      comprising metal, wherein the frame portion has a substantially elongated shape extending in a longitudinal direction and defines one or more cavities extending in the longitudinal direction; and
      comprising one or more missile guides extending in the longitudinal direction, the one or more missile guides each comprising an externally opening slot formed in the metal and having at least one internal corner and the slot configured to slidingly engage a missile hanger within the slot; and
   a composite material enclosed within the one or more cavities and operable to structurally reinforce the frame portion and the at least one internal corner of the one or more missile guides.

2. The apparatus of claim 1, the metal comprising aluminum.

3. The apparatus of claim 1, the composite material comprising a resin and a plurality of fibers.

4. The apparatus of claim 1, further comprising a protective layer disposed outwardly from the frame portion for corrosion resistance and impact resistance.

5. The method of claim 1, the composite material comprising a plurality of fibers soaked in resin, the plurality of fibers selected from the group consisting of graphite, fiberglass, and KEVLAR.

6. The apparatus of claim 1 wherein the slot is free of the composite material.

7. A method comprising:
   forming a frame portion of a missile rail from a metal using an extrusion process, the frame portion:
      having a substantially elongated shape with a longitudinal direction;
      defining one or more cavities situated in the longitudinal direction; and
      comprising one or more missile guides extending in the longitudinal direction, the one or more missile guides each comprising an externally opening slot formed in the metal and having at least one internal corner and the slot configured to slidingly engage a missile hanger within the slot; and
   enclosing a composite material within the one or more cavities, the composite material operable to structurally reinforce the frame portion and the at least one internal corner of the one or more missile guides.

8. The method of claim 7, the disposing the composite material within the one or more cavities further comprising performing the following for a cavity:
   soaking a plurality of fibers in a resin, the plurality of fibers having a length substantially equal to a length of the cavity; and
   disposing the plurality of fibers within the cavity according to a pultrusion process.

9. The method of claim 7, the disposing the composite material within the one or more cavities further comprising performing the following for a cavity:
   soaking a plurality of chopped fibers in a resin; and
   disposing the plurality of chopped fibers into the cavity according to a stuffing process.

10. The method of claim 7, the disposing the composite material within the one or more cavities further comprising:
    disposing resin and a plurality of fibers in the cavity; and
    curing the resin.

11. The method of claim 7, the composite material comprising a plurality of fibers soaked in resin, the plurality of fibers selected from the group consisting of graphite, fiberglass, and KEVLAR.

12. The method of claim 7, further comprising:
    coupling the missile rail to one or more missile launcher components to form a missile launcher; and
    coupling the missile launcher to an aircraft.

13. The method of claim 7 wherein, in the enclosing, the slot remains free of the composite material.

* * * * *